(12) United States Patent
Sakurada et al.

(10) Patent No.: US 10,590,989 B2
(45) Date of Patent: Mar. 17, 2020

(54) BEARING APPARATUS, MOTOR, AND FAN MOTOR

(71) Applicant: NIDEC CORPORATION, Kyoto (JP)

(72) Inventors: Kunio Sakurada, Kyoto (JP); Akinobu Sumiji, Kyoto (JP); Akihiro Yudate, Kyoto (JP); Sho Nakamura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/118,435

(22) Filed: Aug. 31, 2018

(65) Prior Publication Data

US 2019/0093705 A1    Mar. 28, 2019

(30) Foreign Application Priority Data

Sep. 28, 2017 (JP) .................. 2017-187924

(51) Int. Cl.
| | |
|---|---|
| *F16C 32/06* | (2006.01) |
| *F04D 25/06* | (2006.01) |
| *F04D 29/056* | (2006.01) |
| *F04D 29/10* | (2006.01) |
| *F04D 29/063* | (2006.01) |
| *H02K 7/08* | (2006.01) |
| *H02K 21/22* | (2006.01) |
| *H02K 5/16* | (2006.01) |
| *H02K 5/167* | (2006.01) |
| *F04D 29/08* | (2006.01) |

(Continued)

(52) U.S. Cl.
CPC .......... *F16C 32/0633* (2013.01); *F04D 25/06* (2013.01); *F04D 25/062* (2013.01); *F04D 29/056* (2013.01); *F04D 29/063* (2013.01); *F04D 29/083* (2013.01); *F04D 29/102* (2013.01); *F16C 33/745* (2013.01); *H02K 5/163* (2013.01); *H02K 5/1675* (2013.01); *H02K 7/085* (2013.01); *H02K 21/22* (2013.01); *F16C 2360/46* (2013.01); *H02K 7/14* (2013.01)

(58) Field of Classification Search
CPC .... F16C 17/026; F16C 17/107; F16C 17/745; F16C 32/0633; F16C 2360/46; H02K 5/163; H02K 5/1675; H02K 7/085
See application file for complete search history.

(56) References Cited

U.S. PATENT DOCUMENTS

| | | |
|---|---|---|
| 6,084,328 A | 7/2000 | Yamashita et al. |
| 7,635,936 B2 | 12/2009 | Sumi |

(Continued)

FOREIGN PATENT DOCUMENTS

JP    2006-250193 A    9/2006

*Primary Examiner* — Phillip A Johnson
(74) *Attorney, Agent, or Firm* — Hauptman Ham, LLP

(57) ABSTRACT

A bearing apparatus includes a cylindrical sleeve, a shaft rotatably inserted in the sleeve, lubricating oil arranged in a gap defined between an inner circumferential surface of the sleeve and an outer circumferential surface of the shaft, a seal member arranged at an axially upper end portion of the sleeve projecting from the sleeve, and an annular member fixed to an outer circumferential surface of the axially upper end portion of the shaft to rotate together with the shaft. The annular member includes a projecting portion projecting axially downward. The seal member and an axially lower end portion of the projecting portion overlap each other when viewed in at least one of the axial direction or a radial direction.

17 Claims, 9 Drawing Sheets

(51) Int. Cl.
  *F16C 33/74* (2006.01)
  *H02K 7/14* (2006.01)

(56) References Cited

U.S. PATENT DOCUMENTS

| | | |
|---|---|---|
| 8,240,920 B2 | 8/2012 | Sekii et al. |
| 8,277,126 B2 | 10/2012 | Hori et al. |
| 2007/0237438 A1* | 10/2007 | Ito ............... F16C 17/107 384/118 |
| 2011/0033300 A1 | 2/2011 | Li |
| 2012/0033905 A1* | 2/2012 | Oh ............... F16C 17/026 384/115 |
| 2012/0120525 A1* | 5/2012 | Kang ............. G11B 19/2036 360/99.11 |
| 2013/0257203 A1* | 10/2013 | Cheong ............. H02K 5/1675 310/90 |
| 2014/0063653 A1* | 3/2014 | Saeki ............. H02K 7/085 360/99.08 |

\* cited by examiner

BEARING APPARATUS, MOTOR, AND FAN MOTOR

RELATED APPLICATION(S)

The present application claims priority of Japanese Application Number 2017-187924, filed on Sep. 28, 2017, the disclosure of which is hereby incorporated by reference herein in its entirety.

BACKGROUND

1. Field

The present disclosure relates to a bearing apparatus, a motor, and a fan motor.

2. Description of the Related Art

Motors using a dynamic pressure fluid bearing have been known. A known dynamic pressure fluid bearing includes a shaft and a sleeve arranged to rotatably support the shaft. A minute gap is defined between the shaft and the sleeve, and a lubricating fluid is arranged in the minute gap. An outer circumferential surface of the shaft includes a dynamic pressure generating groove arranged to define a gas-liquid interface. Dynamic pressure action of the lubricating fluid in the minute gap allows the shaft to rotate. An electric motor using a dynamic pressure fluid bearing is described in JP-A 11-252859.

SUMMARY

In the fluid bearing apparatus, rotation of the shaft may cause lubricating oil to be scattered. If this happens, an oil loss may occur, causing a reduced product life, unless the scattered lubricating oil is returned to the minute gap as required.

In view of the above circumstances, embodiments of the present disclosure have been conceived to provide a bearing apparatus which is able to retrieve a scattered lubricating oil to prevent an oil loss, a motor including the bearing apparatus, and a fan motor including the bearing apparatus.

According to at least one embodiment of the present disclosure, there is provided a bearing apparatus for a motor. The bearing apparatus includes a cylindrical sleeve centered on a central axis extending in an axial direction, a shaft, lubricating oil, and an annular member. The shaft extends along the central axis, is inserted in the sleeve, is rotatable with respect to the sleeve, and includes an axially upper end portion projecting from the sleeve. The lubricating oil is arranged in a gap defined between an inner circumferential surface of the sleeve and an outer circumferential surface of the shaft. The annular member is fixed to an outer circumferential surface of the axially upper end portion of the shaft, and configured to rotate together with the shaft. The annular member includes a projecting portion projecting axially downward. The sleeve and an axially lower end portion of the projecting portion overlap each other when viewed in at least one of the axial direction or a radial direction.

According to at least one embodiment of the present disclosure, there is provided a bearing apparatus for a motor. The bearing apparatus includes a cylindrical sleeve centered on a central axis extending in an axial direction, a shaft, lubricating oil, a seal member, and an annular member. The shaft extends along the central axis, is inserted in the sleeve, is rotatable with respect to the sleeve, and includes an axially upper end portion projecting from the sleeve. The lubricating oil is arranged in a gap defined between an inner circumferential surface of the sleeve and an outer circumferential surface of the shaft. The seal member is arranged at an axially upper end portion of the sleeve. The annular member is fixed to an outer circumferential surface of the axially upper end portion of the shaft, and configured to rotate together with the shaft. The annular member includes a projecting portion projecting axially downward. The seal member and an axially lower end portion of the projecting portion overlap each other when viewed in at least one of the axial direction or a radial direction.

According to at least one embodiment of the present disclosure, there is provided a bearing apparatus for a motor. The bearing apparatus includes a cylindrical sleeve centered on a central axis extending in an axial direction, a shaft, lubricating oil, a seal member, and an annular member. The shaft extends along the central axis, is inserted in the sleeve, is rotatable with respect to the sleeve, and includes an axially upper end portion projecting from the sleeve. The lubricating oil is arranged in a gap defined between an inner circumferential surface of the sleeve and an outer circumferential surface of the shaft. The seal member arranged at an axially upper end portion of the sleeve. The annular member is fixed to an outer circumferential surface of the axially upper end portion of the shaft, and configured to rotate together with the shaft. The annular member includes a projecting portion projecting axially downward. The seal member includes an annular cover portion covering an axially upper surface of the sleeve, and a cylindrical portion extending axially downward from a radially outer end portion of the cover portion, and covering an outer circumferential surface of the sleeve. The radially outer end portion of the cover portion and an inner circumferential surface of the projecting portion overlap each other when viewed in the axial direction.

According to at least one embodiment of the present disclosure, if the lubricating oil is scattered out of the minute gap, the lubricating oil will be caused by a centrifugal force to travel from an axially lower surface of the annular member, which rotates together with the shaft, toward an inner circumferential surface of the projecting portion. Then, an interface of the lubricating oil will be formed between the projecting portion and the sleeve after the lubricating oil is accumulated on the inner circumferential surface of the projecting portion. Thereafter, the lubricating oil will travel due to a migration phenomenon. The lubricating oil will thus be returned directly to the minute gap or be transferred to another space being in communication with the minute gap, whereby the scattered lubricating oil can be retrieved to prevent an oil loss of the bearing apparatus.

The above and other elements, features, steps, characteristics and advantages of one or more embodiments of the instant application will become more apparent from the following detailed description of example embodiments with reference to the attached drawings.

DETAILED DESCRIPTION

Hereinafter, example embodiments of the present disclosure will be described with reference to the accompanying drawings. Bearing apparatuses according to some embodiments of the present disclosure are used in motors. Such a motor is a fan motor used in a device that will have a high temperature, such as, for example, a headlight on a vehicle, to supply a cooling air flow. Note that such a motor may be used as, for example, an apparatus to supply a cooling air flow to a household electrical appliance, such as a refrigerator, or an interior of a room, such as a server room, in which a plurality of electronic devices are installed.

It is assumed herein that a direction parallel to a central axis of a motor is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a rotating portion is arranged with respect to a base plate is an upper side. The shape of each member or portion and relative positions of different members or portions will be described based on the above assumptions. It should be noted, however, that the above definitions of the vertical direction and the upper and lower sides are not meant to restrict in any way the orientation of a motor according to any embodiment of the present disclosure when in use.

Also note that the term "parallel" as used herein includes both "parallel" and "substantially parallel". Also note that the term "perpendicular" as used herein includes both "perpendicular" and "substantially perpendicular".

1. Overall Structure of Motor

Figure 1:
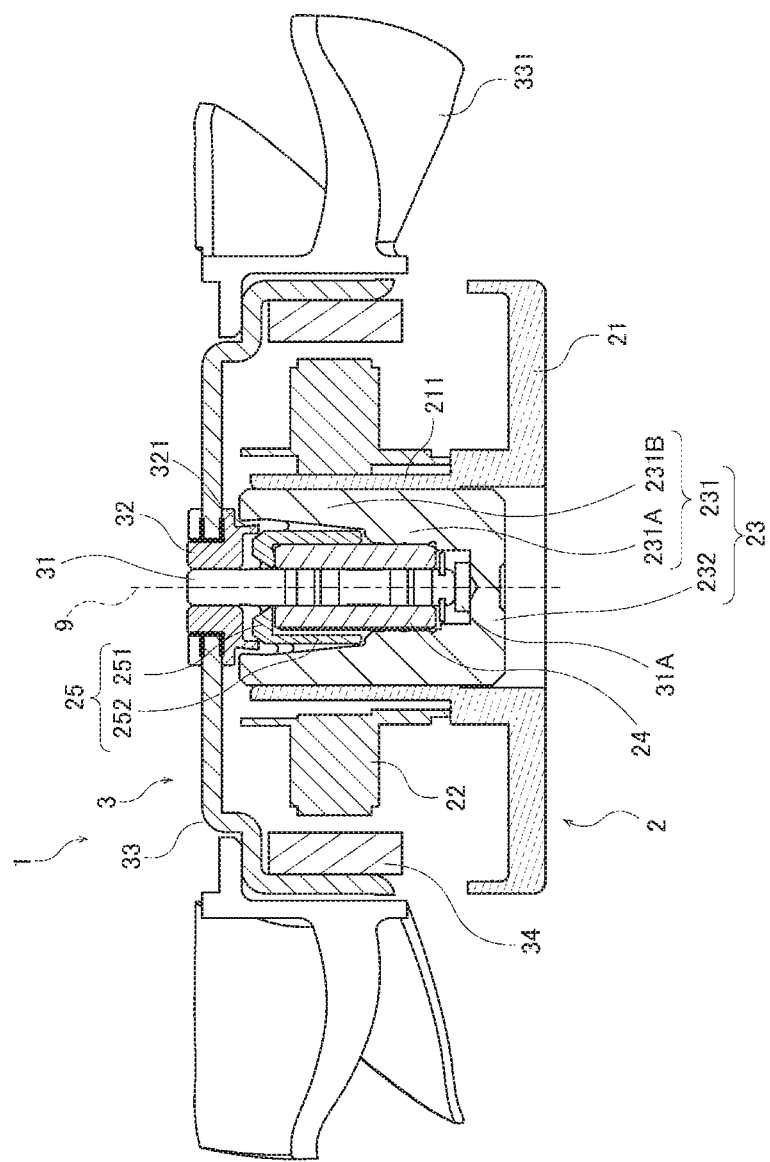
FIG. 1 is a sectional view of a motor according to at least one embodiment of the present disclosure.
Figure 2:
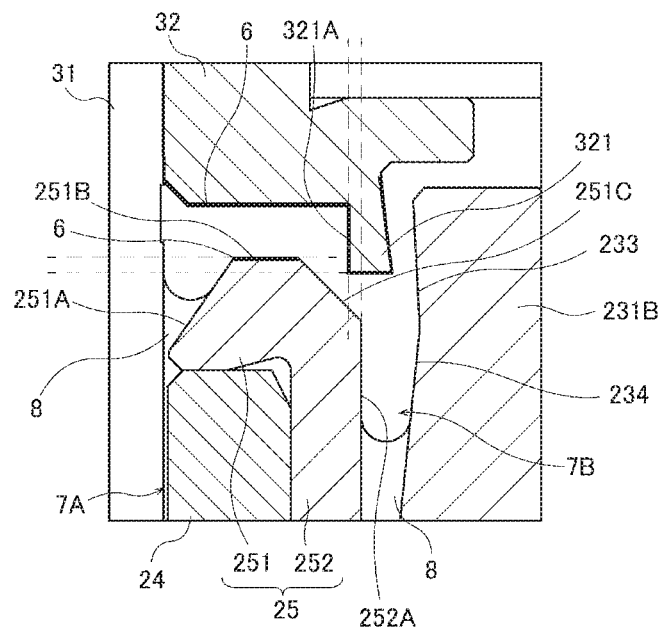
FIG. 2 is a diagram illustrating a portion of the motor in an enlarged form.

FIG. 1 is a sectional view of a motor 1 according to at least one embodiment of the present disclosure. FIG. 2 is a diagram illustrating a portion of the motor 1 in an enlarged form.

The motor 1 includes a stationary portion 2 and a rotating portion 3. The stationary portion 2 is fixed to a frame of a device in which the motor 1 is installed. The rotating portion 3 is supported to be rotatable with respect to the stationary portion 2.

The stationary portion 2 includes a base plate 21, a stator 22, a sleeve housing 23, a sleeve 24, and a seal member 25.

The base plate 21 is a plate-shaped member arranged to extend perpendicularly to a central axis 9. The base plate 21 is fixed to the frame of the device in which the motor 1 is installed through, for example, screwing. The base plate 21 includes a cylindrical bearing housing 211 arranged to extend in an axial direction and surround the central axis 9. The bearing housing 211 is arranged to hold the sleeve housing 23, which will be described below, with a radially inner side thereof. The base plate 21 is made of, for example, a metal such as iron. Note, however, that the base plate 21 may not necessarily be made of a metal, but may alternatively be made of a resin.

The stator 22 is an armature arranged to generate magnetic flux in accordance with electric drive currents. The stator 22 is arranged radially outside of the bearing housing 211. The stator 22 includes a stator core (not shown), which is a magnetic body. Conducting wires are wound around the stator core with an insulator interposed therebetween to define coils (not shown). Then, electric currents are caused to pass through the coils to generate radial magnetic flux.

The sleeve housing 23 is held by an inner circumferential surface of the bearing housing 211. The sleeve housing 23 includes a bottom portion 232 and a cylindrical side wall portion 231 arranged to extend in the axial direction.

The side wall portion 231 is cylindrical, extending in the axial direction, and is arranged to extend in a circumferential direction to surround the central axis 9. The side wall portion 231 includes a small diameter portion 231A arranged on an axially lower side, and a large diameter portion 231B arranged axially above the small diameter portion 231A. The small diameter portion 231A is arranged to have an opening size smaller than that of the large diameter portion 231B. In other words, a distance from the central axis 9 to an inner circumferential surface of the small diameter portion 231A is shorter than a distance from the central axis 9 to an inner circumferential surface of the large diameter portion 231B.

The sleeve 24 is arranged radially inside of the small diameter portion 231A and the large diameter portion 231B. The small diameter portion 231A is arranged to hold an axially lower portion of the sleeve 24 with the inner circumferential surface thereof. Meanwhile, the large diameter portion 231B is arranged opposite to an axially upper portion of the sleeve 24 with a space therebetween. More specifically, the seal member 25, which will be described below, is arranged around the axially upper portion of the sleeve 24. The large diameter portion 231B is arranged radially outward of the seal member 25, and is arranged opposite to the seal member 25 with a space 7B therebetween. Lubricating oil 8 is arranged in the space 7B.

The inner circumferential surface of the large diameter portion 231B, which is radially opposite to the seal member 25, is recessed radially outward. In addition, the inner circumferential surface of the large diameter portion 231B includes a tapered portion arranged to increase in diameter with increasing height. More specifically, the inner circumferential surface of the large diameter portion 231B includes an increased diameter portion 233 and a decreased diameter portion 234. The increased diameter portion 233 is a portion of the inner circumferential surface which is arranged to extend radially outward with decreasing height, i.e., the increased diameter portion 233 is a portion of the inner circumferential surface which is arranged to extend radially downward from an axially upper end of the inner circumferential surface of the large diameter portion 231B while slanting radially outward. The decreased diameter portion 234 is a portion of the inner circumferential surface which is arranged to extend axially downward from an axially lower end of the increased diameter portion 233 while slanting radially inward.

The bottom portion 232 is arranged at an axially lower end portion of the side wall portion 231. The bottom portion 232 is arranged to support a shaft 31 with an upper surface thereof through a flange 31A.

The sleeve 24 is a cylindrical member arranged to extend in the axial direction and surround the central axis 9. The sleeve 24 is a porous body including a large number of minute holes, and is made of, for example, a sintered metal including copper as a main component. The sintered metal is impregnated with lubricating oil. Note, however, that the sleeve 24 may not necessarily be made of a sintered metal including a large number of minute holes, but may alternatively be a metal body including copper as a main component and including no minute holes, or may alternatively be made of stainless steel. The sleeve 24 is held by the inner circumferential surface of the small diameter portion 231A of the sleeve housing 23. The shaft 31 is rotatably inserted in the sleeve 24. A minute gap 7A illustrated in FIG. 2 is defined between an inner circumferential surface of the sleeve 24 and an outer circumferential surface of the shaft 31. The lubricating oil 8 is arranged in the minute gap 7A. The inner circumferential surface of the sleeve 24 includes a dynamic pressure groove (not shown) arranged to generate a dynamic pressure through the lubricating oil 8.

The seal member 25 includes a cover portion 251 and a cylindrical portion 252. The cover portion 251 is a portion being annular around the central axis 9. The cover portion 251 is arranged to cover an axially upper surface of the sleeve 24. The cylindrical portion 252 is a portion arranged to project axially downward from a radially outer end portion of the cover portion 251. The cylindrical portion 252 is arranged to cover an outer circumferential surface of the axially upper portion of the sleeve 24. In addition, an outer circumferential surface of the cylindrical portion 252 includes a side surface 252A arranged to extend in the axial direction. The side surface 252A of the cylindrical portion 252 is arranged radially opposite to the aforementioned decreased diameter portion 234 of the large diameter portion 231B.

The seal member 25 is arranged radially inside of the large diameter portion 231B of the sleeve housing 23. The space 7B is defined between the side surface 252A of the cylindrical portion 252 of the seal member 25 and the inner circumferential surface of the large diameter portion 231B. The lubricating oil 8 is arranged in the space 7B. The space 7B is arranged to be in communication with the minute gap 7A between the sleeve 24 and the shaft 31. For example, a space (not shown) is defined also between an outer circumferential surface of the sleeve 24 and the inner circumferential surface of the small diameter portion 231A, and the space 7B is arranged to be in communication with the minute gap 7A through this space and a space axially below the sleeve 24. That is, the lubricating oil 8 is able to circulate between the minute gap 7A and the space 7B.

An upper surface of the cover portion 251 includes a first slanting surface 251A, a flat surface 251B, and a second slanting surface 251C, which are arranged in the order named from the shaft 31 radially outward. The flat surface 251B is a surface arranged to extend radially. The first slanting surface 251A is a surface opposite to the shaft 31 and arranged to extend axially downward and radially inward from the flat surface 251B. The second slanting surface 251C is a surface arranged to extend axially downward and radially outward from the flat surface 251B. The second slanting surface 251C may be either straight or curved in a section. In addition, at least the flat surface 251B has an oil-repellent agent 6 applied thereto.

The rotating portion 3 includes the shaft 31, a fixing ring 32, a hub 33, and a magnet 34. Note that the shaft 31 and the fixing ring 32 of the rotating portion 3, the sleeve 24 and the seal member 25 of the stationary portion 2, and the lubricating oil 8 together define a bearing apparatus according to at least one embodiment of the present disclosure.

The shaft 31 is a columnar member arranged to extend along the central axis 9. A metal, such as stainless steel, for example, is used as a material of the shaft 31. The shaft 31 is inserted in the sleeve 24, is supported to be rotatable with respect to the sleeve 24, and includes an axially upper end portion arranged to project from the sleeve 24. An axially lower end portion of the shaft 31 is also arranged to project from the sleeve 24. Then, as mentioned above, the shaft 31 is supported by the upper surface of the bottom portion 232 of the sleeve housing 23 through the flange 31A.

The fixing ring 32 is an annular member fixed to an outer circumferential surface of the axially upper end portion of the shaft 31, and arranged to rotate together with the shaft 31. The fixing ring 32 is made of, for example, a metal. The fixing ring 32 is arranged axially above the seal member 25 with a space therebetween. The oil-repellent agent 6 is applied to a lower surface of the fixing ring 32.

The fixing ring 32 includes a projecting portion 321 arranged to project axially downward. The projecting portion 321 is arranged to extend in the circumferential direction to surround the shaft 31. An inner circumferential surface 321A of the projecting portion 321 is a surface substantially parallel to the central axis 9, and radially opposite to the shaft 31. Note, however, that the inner circumferential surface 321A of the projecting portion 321 may alternatively be curved to become gradually more distant from the shaft 31 with decreasing height.

An axially lower end portion of the projecting portion 321 is arranged to overlap the seal member 25 when viewed in at least one of the axial direction or a radial direction. More specifically, the projecting portion 321 is arranged radially between the second slanting surface 251C and the aforementioned increased diameter portion 233 of the large diameter portion 231B. In addition, a radially inner and axially lower end portion of the projecting portion 321 is arranged to overlap the second slanting surface 251C when viewed in each of the axial direction and the radial direction. Further, the fixing ring 32 and the seal member 25 are closest to each other between the second slanting surface 251C and the radially inner and axially lower end portion of the projecting portion 321. That is, as indicated by dashed lines in FIG. 2, the radially inner and axially lower end portion of the projecting portion 321 is arranged below the flat surface 251B and radially inward of the side surface 252A of the cylindrical portion 252. Thus, a minute gap lies between the second slanting surface 251C and the radially inner and axially lower end portion of the projecting portion 321. The shortest distance between the second slanting surface 251C and the radially inner and axially lower end portion of the projecting portion 321 is, for example, in the range of 0.15 mm to 0.30 mm.

The large diameter portion 231B of the sleeve housing 23 is arranged radially outward of the cylindrical portion 252 of the seal member 25, and is arranged radially outward of the projecting portion 321. In addition, at least a portion of the projecting portion 321 is arranged to overlap the space 7B between the cylindrical portion 252 and the large diameter portion 231B when viewed in the axial direction.

The hub 33 is a member in the shape of a circular ring, and arranged to hold the magnet 34. A metal, such as iron, for example, is used as a material of the hub 33. The hub 33 is fixed to the fixing ring 32, and is arranged to extend substantially perpendicularly to the central axis 9 above the stator 22. The hub 33 is provided with a fan 331. The hub 33 is arranged to rotate together with the fan 331 and the shaft 31 through the fixing ring 32.

The magnet 34 is fixed to an inner circumferential surface of the hub 33. The magnet 34 may be a single magnet in the shape of a circular ring, or alternatively, a plurality of magnets arranged in the circumferential direction may be used as the magnet 34. A radially inner surface of the magnet 34 includes north and south poles arranged to alternate with each other in the circumferential direction.

Once electric drive currents are supplied to the coils of the stator 22 in the motor 1 described above, magnetic flux is generated to produce a rotating magnetic field between the stator 22 and the magnet 34. Thus, a circumferential torque is produced. As a result, the rotating portion 3 is caused to rotate about the central axis 9 with respect to the stationary portion 2.

2. Retrieval of Lubricating Oil

In the case where the motor 1 having the above-described structure is used in a device that will have a high temperature, the lubricating oil 8 in the minute gap 7A between the shaft 31 and the sleeve 24 may vaporize, and rotation of the shaft 31 may cause the lubricating oil 8 to be scattered out of the minute gap 7A. In addition, not only vaporization but also a vibration or shock that occurs while the motor 1 is running may cause the lubricating oil 8 to be scattered. Having the above-described structure, the motor 1 according to at least one embodiment is able to retrieve the scattered lubricating oil 8 (hereinafter referred to as scattered oil 8A). An action of the scattered oil when the scattered oil is retrieved will now be described below.

Figure 3:
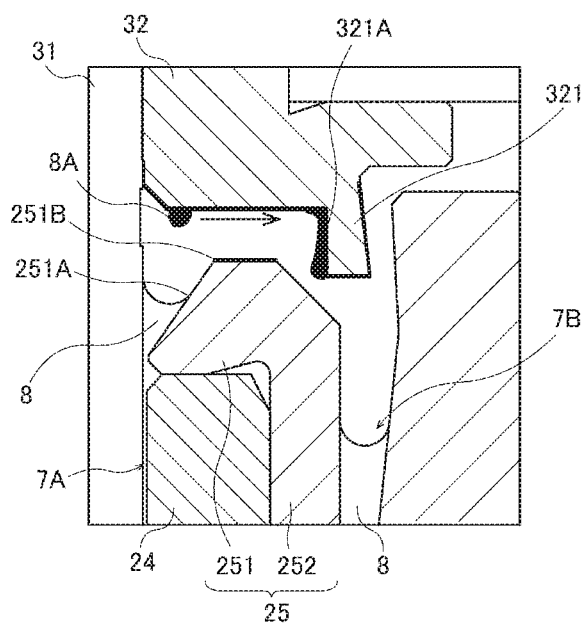
FIG. 3 is a diagram for explaining how scattered oil is retrieved.
Figure 4:
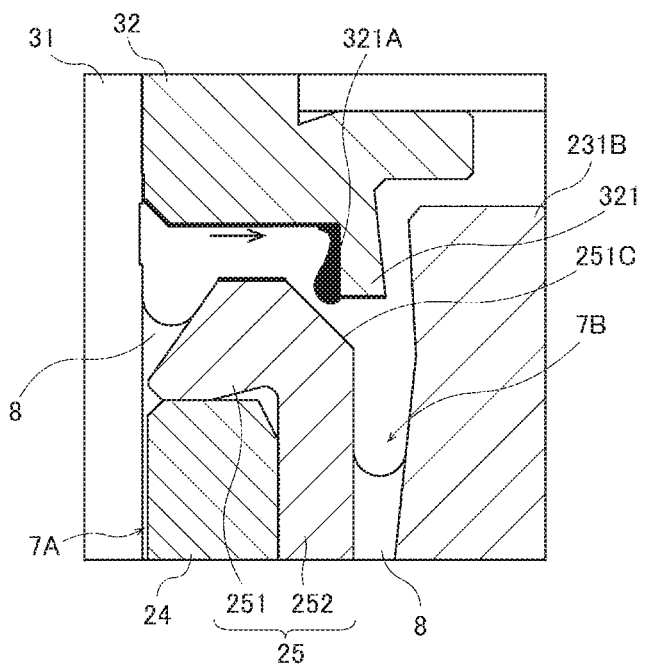
FIG. 4 is a diagram for explaining how the scattered oil is retrieved.
Figure 5:
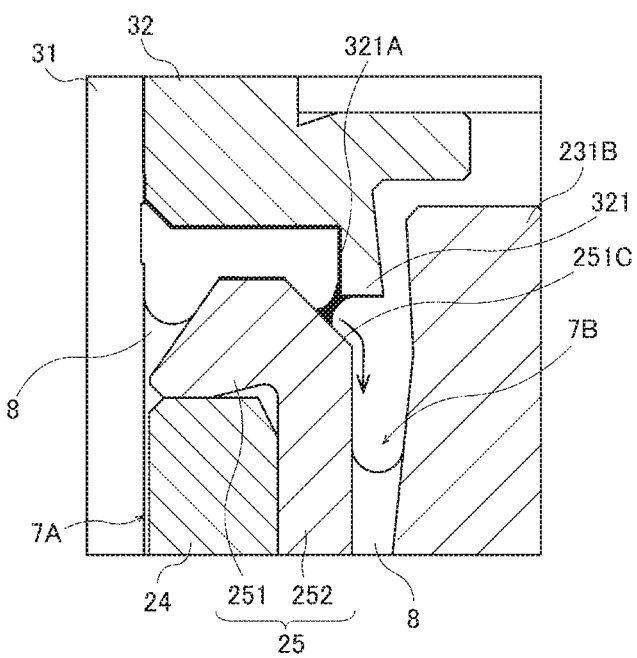
FIG. 5 is a diagram for explaining how the scattered oil is retrieved.

FIGS. 3, 4, and 5 are diagrams for explaining how the scattered oil 8A is retrieved.

The scattered oil 8A, having been scattered out of the minute gap 7A, is caused by a centrifugal force caused by the rotation of the shaft 31 to travel radially outward toward the projecting portion 321. The scattered oil 8A is attached to the lower surface of the fixing ring 32, which is axially opposite to the first slanting surface 251A or the flat surface 251B. The axially lower surface of the fixing ring 32 has the oil-repellent agent 6 applied thereto. Therefore, the scattered oil 8A attached to the lower surface of the fixing ring 32 travels toward the projecting portion 321 along the lower surface of the fixing ring 32 as indicated by an arrow in FIG. 3.

The scattered oil 8A, having been caused by the centrifugal force to travel to the projecting portion 321, is received by the inner circumferential surface 321A of the projecting portion 321. Thus, the scattered oil 8A is accumulated on the inner circumferential surface 321A of the projecting portion 321. As the accumulation of the scattered oil 8A on the inner circumferential surface 321A of the projecting portion 321 continues, the scattered oil 8A increases in volume. Thereafter, as illustrated in FIG. 4, the weight of the scattered oil 8A causes the scattered oil 8A to be accumulated at a lower end portion of the inner circumferential surface 321A of the projecting portion 321. The accumulated scattered oil 8A makes contact with a portion of the second slanting surface 251C which is closest to the lower end portion of the inner circumferential surface 321A of the projecting portion 321.

The second slanting surface 251C has no oil-repellent agent applied thereto. Once the scattered oil 8A makes contact with the second slanting surface 251C, an interface of the scattered oil 8A is formed between the projecting portion 321 and the second slanting surface 251C as illustrated in FIG. 5. Due to a migration phenomenon, the accumulated scattered oil 8A travels along the second slanting surface 251C and the side surface 252A of the cylindrical portion 252. Then, the scattered oil 8A is retrieved to the space 7B, which is in communication with the minute gap 7A.

If the scattered oil 8A is scattered radially outward beyond the projecting portion 321, the scattered oil 8A will be received by the increased diameter portion 233 and the decreased diameter portion 234 of the large diameter portion 231B. A portion of the scattered oil 8A which has been received by the decreased diameter portion 234 travels axially downward along the decreased diameter portion 234, and is retrieved to the space 7B. Meanwhile, a portion of the scattered oil 8A which has been received by the increased diameter portion 233 travels axially downward along the increased diameter portion 233 and then along the decreased diameter portion 234, and is retrieved to the space 7B. A leakage of the scattered oil 8A out of the sleeve housing 23 can thus be prevented.

The increased diameter portion 233 is, in other words, an inner circumferential surface extending radially inward with increasing height. Accordingly, when compared to the case where the increased diameter portion 233 is replaced with an inner circumferential surface extending axially downward in a straight line, or an inner circumferential surface extending radially outward with increasing height, the distance between the projecting portion 321 and the increased diameter portion 233 becomes gradually shorter with increasing height. This reduces the likelihood that the scattered oil 8A will be further scattered radially outward beyond the large diameter portion 231B through a space between the projecting portion 321 and the increased diameter portion 233.

In at least one embodiment, the distance between the projecting portion 321 and the second slanting surface 251C is arranged to be, for example, in the range of 0.15 mm to 0.30 mm. Note, however, that this distance may be modified appropriately in accordance with the rotation rate of the shaft 31. For example, when the shaft 31 rotates at a high rotation rate, a large centrifugal force will be applied to the scattered oil 8A. In this case, the scattered oil 8A accumulated on the axially lower end portion of the projecting portion 321 may travel radially outward without making contact with the seal member 25 if the distance between the projecting portion 321 and the second slanting surface 251C is large. It is therefore desirable that the distance between the projecting portion 321 and the seal member 25 is modified in accordance with the rotation rate of the shaft 31 to allow the interface of the scattered oil 8A to be formed therebetween.

As described above, even if the lubricating oil 8 is scattered out of the minute gap 7A, the scattered oil 8A will be retrieved to the space 7B, which is in communication with the minute gap 7A, and this reduces the likelihood of a loss of the lubricating oil 8 in the minute gap 7A. This in turn contributes to avoiding a reduction in a product life of the motor 1 due to an oil loss.

3. Example Modifications

While at least one embodiment of the present disclosure has been described above, it is to be understood that the present disclosure is not limited to the above-described at least one embodiment.

3.1. First Modification

Figure 6:
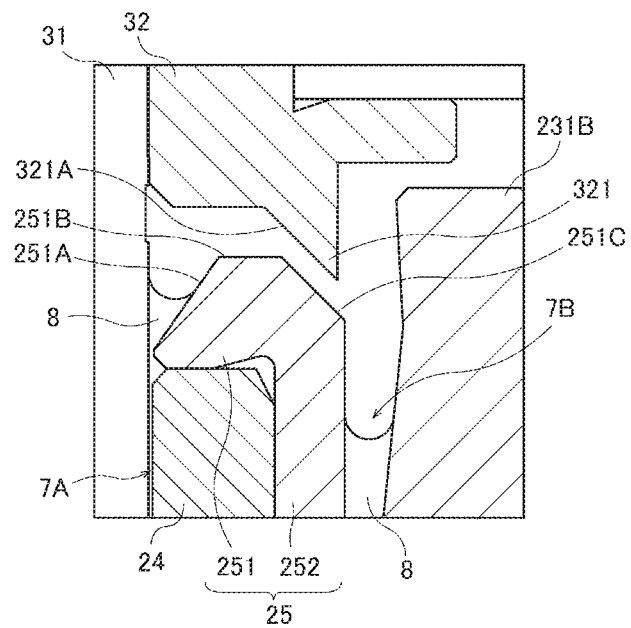
FIG. 6 is a diagram illustrating a portion of a motor according to a first modification in accordance with at least one embodiment in an enlarged form.

FIG. 6 is a diagram illustrating a portion of a motor according to a first modification in accordance with at least one embodiment in an enlarged form.

In the above-described at least one embodiment, the inner circumferential surface 321A of the projecting portion 321 may be curved to become gradually more distant from the shaft 31 with decreasing height. In contrast, in the first modification, an inner circumferential surface 321A is straight in a section. In FIG. 6, the inner circumferential surface 321A and a second slanting surface 251C are parallel to each other and at substantially the same angle to a central axis 9.

Also with this configuration, an axially lower end portion of a projecting portion 321 is arranged to overlap the second slanting surface 251C when viewed in each of the axial direction and the radial direction. In addition, scattered oil accumulated on the axially lower end portion of the projecting portion 321 will be held between the second slanting surface 251C and the axially lower end portion of the projecting portion 321. Then, the scattered oil will be retrieved to a space 7B due to a migration phenomenon.

3.2. Second Modification

In the above-described at least one embodiment, the axially lower end portion of the projecting portion 321 is arranged to overlap the seal member 25 when viewed in each of the axial direction and the radial direction. Note, however, that the axially lower end portion of the projecting portion 321 may be arranged to overlap the seal member 25 when viewed in at least one of the axial direction or the radial direction.

Each of FIGS. 7, 8, 9, and 10 is a diagram illustrating a portion of a motor according to a second modification in accordance with at least one embodiment in an enlarged form.

Figure 7:
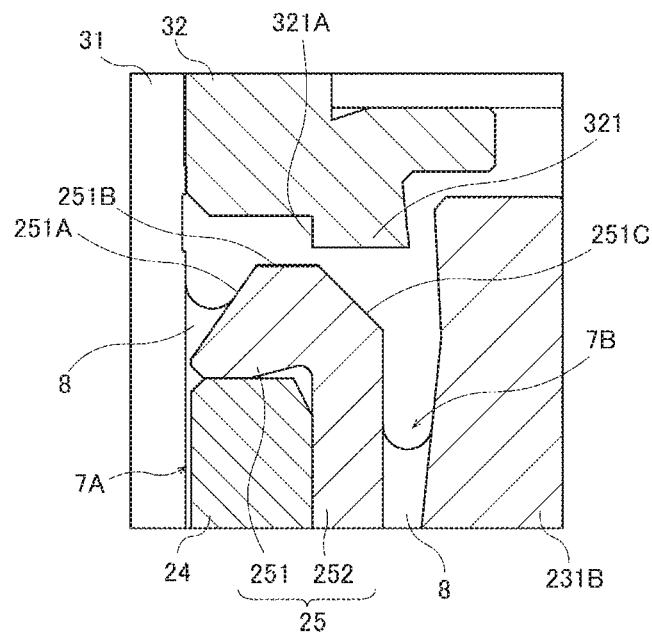
FIG. 7 is a diagram illustrating a portion of a motor according to a second modification in accordance with at least one embodiment in an enlarged form.
Figure 8:
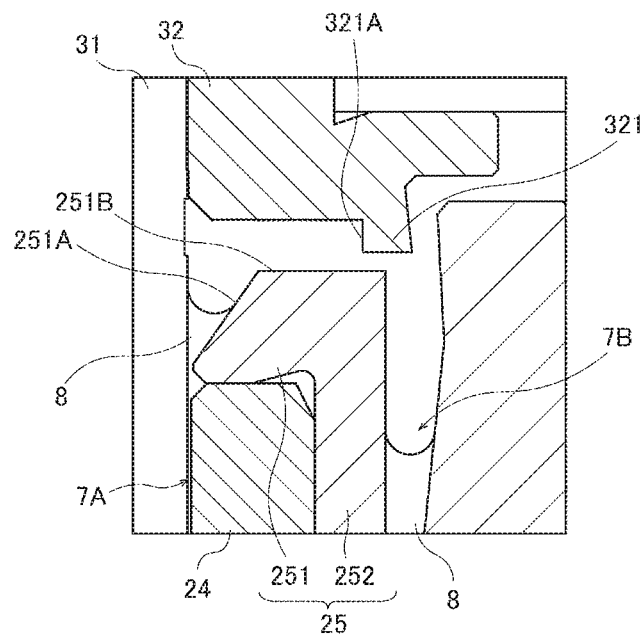
FIG. 8 is a diagram illustrating a portion of a motor according to the second modification.

In each of examples illustrated in FIGS. 7 and 8, a projecting portion 321 is arranged to overlap a seal member 25 only when viewed in the axial direction and not when viewed in the radial direction. In other words, an axially lower end portion of the projecting portion 321 is arranged axially above the seal member 25. Further, in the example illustrated in FIG. 8, the seal member 25 does not include a second slanting surface 251C.

With this configuration, a radially inner and axially lower end portion of the projecting portion 321 is closer to a flat surface 251B than to any other portion of the seal member 25. Thus, accumulated scattered oil will be held between the projecting portion 321 and the flat surface 251B. Thereafter, the scattered oil will be retrieved to a space 7B due to a migration phenomenon.

Figure 9:
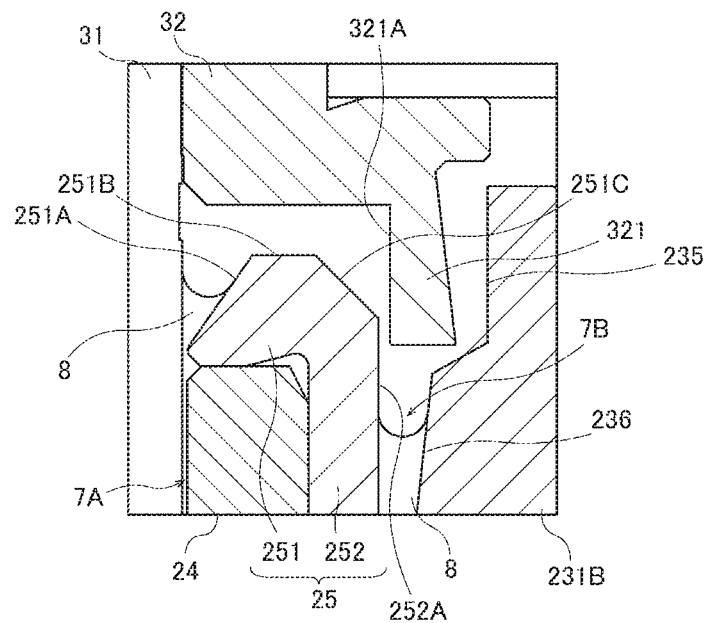
FIG. 9 is a diagram illustrating a portion of a motor according to the second modification.
Figure 10:
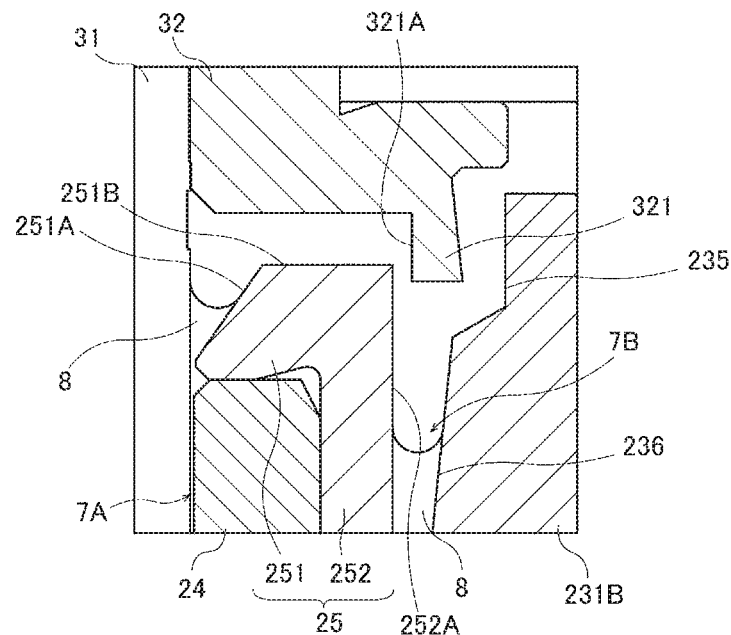
FIG. 10 is a diagram illustrating a portion of a motor according to the second modification.

In each of examples illustrated in FIGS. 9 and 10, a projecting portion 321 is arranged to overlap a seal member 25 only when viewed in the radial direction and not when viewed in the axial direction. That is, a radially inner and axially lower end portion of the projecting portion 321 is arranged to overlap a side surface 252A of a cylindrical portion 252 when viewed in the radial direction. In addition, a fixing ring 32 and the seal member 25 are closest to each other between the radially inner and axially lower end portion of the projecting portion 321 and an outer circumferential surface of the cylindrical portion 252. Further, in the example illustrated in FIG. 10, the seal member 25 does not include a second slanting surface 251C.

With each of the configurations of FIGS. 9 and 10, accumulated scattered oil will be held between the radially inner and axially lower end portion of the projecting portion 321 and the outer circumferential surface of the cylindrical portion 252. Then, the scattered oil will be retrieved to a space 7B due to a migration phenomenon.

In each of the examples illustrated in FIGS. 9 and 10, an inner circumferential surface of a large diameter portion 231B of a side wall portion 231 includes a first inner circumferential surface 235 arranged radially opposite to the projecting portion 321, and a second inner circumferential surface 236 arranged axially below an axially lower end portion of the projecting portion 321 and radially inward of the first inner circumferential surface 235. The second inner circumferential surface 236 is arranged to overlap the projecting portion 321 when viewed in the axial direction. If scattered oil 8A is scattered radially outward beyond the projecting portion 321, the scattered oil 8A will be received by the first inner circumferential surface 235 or the second inner circumferential surface 236 of the large diameter portion 231B. A leakage of the scattered oil 8A out of a sleeve housing 23 can thus be prevented.

3.3. Third Modification

In a third modification in accordance with at least one embodiment, an axially lower end portion of a projecting portion 321 does not overlap a seal member 25 when viewed in either of the axial direction and the radial direction.

Figure 11:
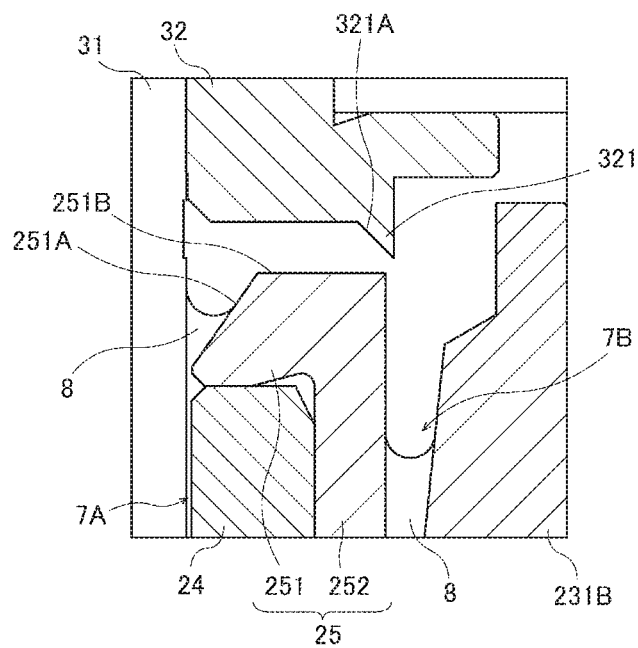
FIG. 11 is a diagram illustrating a portion of a motor according to a third modification in accordance with at least one embodiment in an enlarged form.
Figure 12:
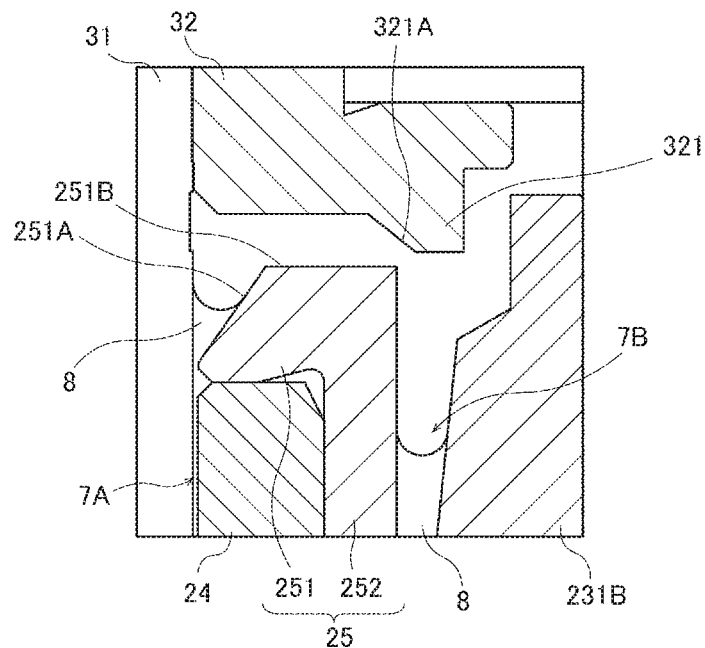
FIG. 12 is a diagram illustrating a portion of a motor according to the third modification.

Each of FIGS. 11 and 12 is a diagram illustrating a portion of a motor according to the third modification in an enlarged form.

In each of examples illustrated in FIGS. 11 and 12, a cover portion 251 of the seal member 25 does not include a second slanting surface 251C. In addition, a radially outer end portion of the cover portion 251 of the seal member 25 is arranged to overlap an inner circumferential surface 321A of the projecting portion 321 when viewed in the axial direction. In addition, the axially lower end portion of the projecting portion 321 is arranged radially outward of the seal member 25, and is arranged to overlap a space 7B when viewed in the axial direction.

With this configuration, accumulated scattered oil will be held between the inner circumferential surface 321A of the projecting portion 321 and the radially outer end portion of the cover portion 251. Then, the scattered oil will be retrieved to the space 7B due to a migration phenomenon.

3.4. Fourth Modification

Figure 13:
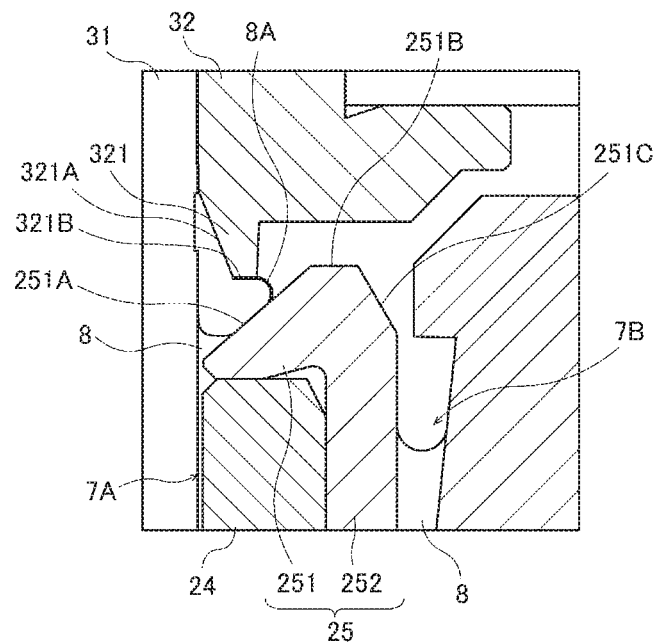
FIG. 13 is a diagram illustrating a portion of a motor according to a fourth modification in accordance with at least one embodiment in an enlarged form.

FIG. 13 is a diagram illustrating a portion of a motor according to a fourth modification in accordance with at least one embodiment in an enlarged form.

In the fourth modification, a projecting portion 321 is arranged at a radially inner end portion of a fixing ring 32. An inner circumferential surface 321A of the projecting portion 321 is a slanting surface that becomes gradually more distant from a shaft 31 with decreasing height. A radially outer and axially lower end portion of the projecting portion 321 is arranged to overlap a first slanting surface 251A when viewed in each of the axial direction and the radial direction. In addition, the fixing ring 32 and a seal member 25 are closest to each other between the first slanting surface 251A and the radially outer and axially lower end portion of the projecting portion 321.

With this configuration, scattered oil 8A will travel along the inner circumferential surface 321A and an axially lower surface 321B of the projecting portion 321 due to a centrifugal force, and will be accumulated at an end portion of the axially lower surface 321B. Then, as illustrated in FIG. 13, an interface of the scattered oil 8A will be formed between the first slanting surface 251A and the axially lower surface 321B of the projecting portion 321. In this modification, due to a migration phenomenon, the scattered oil 8A will travel along the first slanting surface 251A to be retrieved to a minute gap 7A.

3.5. Fifth Modification

Figure 14:
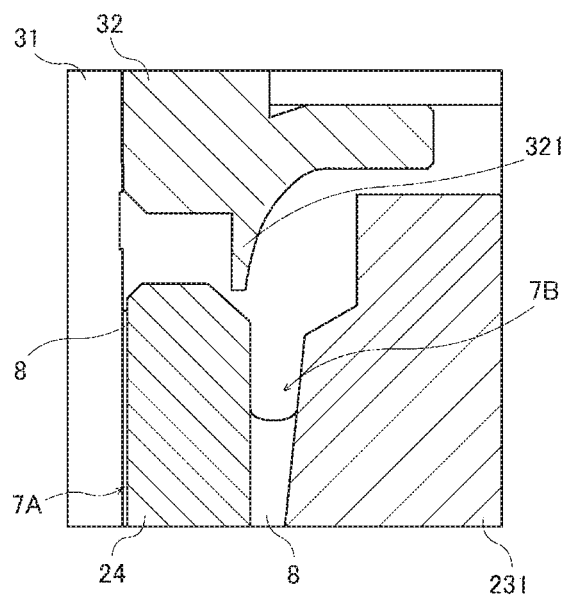
FIG. 14 is a diagram illustrating a portion of a motor according to a fifth modification in accordance with at least one embodiment in an enlarged form.

FIG. 14 is a diagram illustrating a portion of a motor according to a fifth modification in accordance with at least one embodiment in an enlarged form.

The motor according to the fifth modification does not include a seal member 25. In addition, a projecting portion 321 of a fixing ring 32 and a sleeve 24 are arranged to overlap each other when viewed in at least one of the axial direction or the radial direction. In FIG. 14, the projecting portion 321 of the fixing ring 32 and the sleeve 24 are arranged to overlap each other when viewed in each of the axial direction and the radial direction. In addition, a space 7B in which lubricating oil 8 is arranged is defined between the sleeve 24 and a side wall portion 231 of a sleeve housing 23.

With this configuration, an axially lower end portion of the projecting portion 321 of the fixing ring 32 is closer to the sleeve 24 than to any other member of the motor. Scattered oil will be held between the sleeve 24 and the projecting portion 321 of the fixing ring 32. Then, the scattered oil will be retrieved to the space 7B due to a migration phenomenon.

3.6. Sixth Modification

Figure 15:
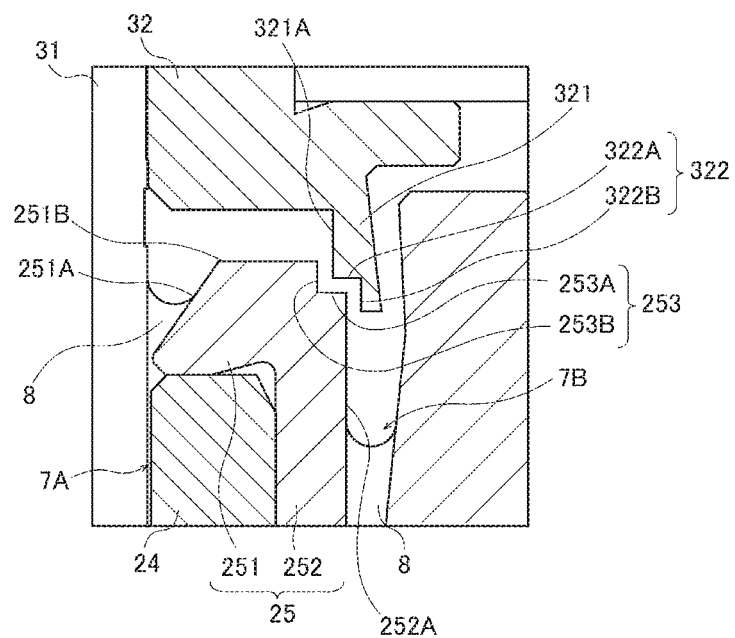
FIG. 15 is a diagram illustrating a portion of a motor according to a sixth modification in accordance with at least one embodiment in an enlarged form.
Figure 16:
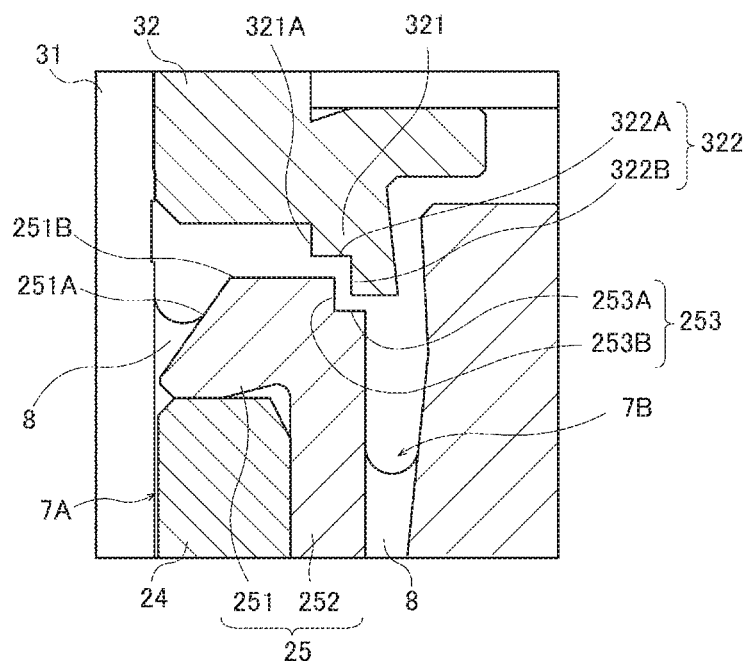
FIG. 16 is a diagram illustrating a portion of a motor according to the sixth modification.

Each of FIGS. 15 and 16 is a diagram illustrating a portion of a motor according to a sixth modification in accordance with at least one embodiment in an enlarged form.

In the sixth modification, a side surface 252A of a cylindrical portion 252 includes a first shoulder portion 253 recessed radially inward. The first shoulder portion 253 includes a first surface 253A arranged to extend radially, and a second surface 253B arranged to extend in the axial direction. An axially lower end portion of an inner circumferential surface 321A of a projecting portion 321 includes a second shoulder portion 322 recessed radially outward. The second shoulder portion 322 includes a first surface 322A arranged to extend radially, and a second surface 322B arranged to extend in the axial direction. The second shoulder portion 322 is arranged close to the first shoulder portion 253. In addition, a fixing ring 32 and a seal member 25 are closest to each other between the first shoulder portion 253 and the second shoulder portion 322.

In the case of FIG. 15, an interface of scattered oil 8A will be formed between the axially lower end portion of the inner circumferential surface 321A of the projecting portion 321 and the second surface 253B, which extends in the axial direction, of the first shoulder portion 253. In addition, the second surface 322B, which extends in the axial direction, of the second shoulder portion 322 and the side surface 252A of the cylindrical portion 252 are arranged radially opposite to each other. Thus, the scattered oil 8A can be retrieved to a space 7B without leaking out of a sleeve housing 23. Note that an interface of the scattered oil 8A can be formed also between the second surface 322B, which extends in the axial direction, of the second shoulder portion 322 and the side surface 252A of the cylindrical portion 252.

In the case of FIG. 16, an interface of scattered oil 8A will be formed between the axially lower end portion of the inner circumferential surface 321A of the projecting portion 321 and a flat surface 251B of a cover portion 251. In addition, the second surface 322B, which extends in the axial direction, of the second shoulder portion 322 and the first surface 253A, which extends radially, of the first shoulder portion 253 are arranged axially opposite to each other. Thus, the scattered oil 8A can be retrieved to a space 7B without leaking out of a sleeve housing 23. Note that an interface of the scattered oil 8A can be formed also between an axially lower end portion of the second surface 322B, which extends in the axial direction, of the second shoulder portion 322 and the first surface 253A, which extends radially, of the first shoulder portion 253.

In each of FIGS. 15 and 16, the seal member 25 does not include a second slanting surface 251C, and the first shoulder portion 253 is defined in the side surface 252A of the cylindrical portion 252. Note, however, that the seal member 25 may alternatively include the second slanting surface 251C, and the first shoulder portion 253 may alternatively be defined in the second slanting surface 251C.

2.7. Seventh Modification

Figure 17:
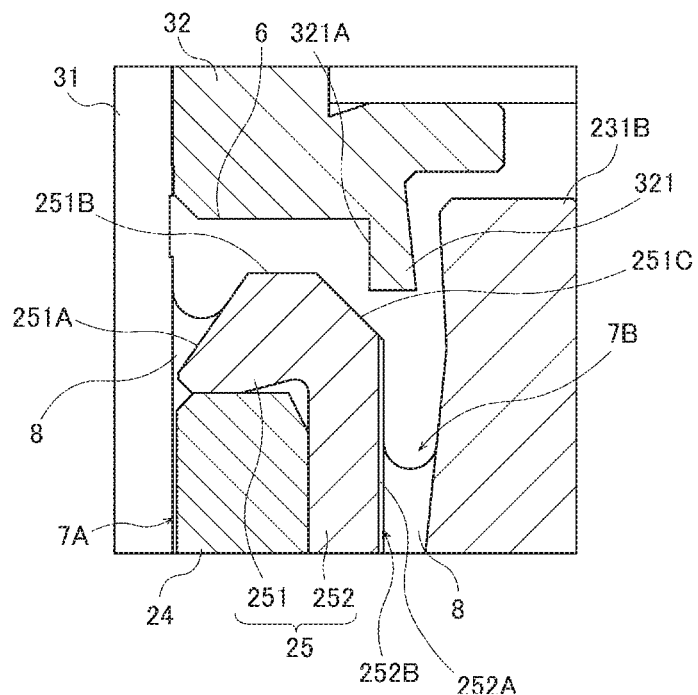
FIG. 17 is a diagram illustrating a portion of a motor according to a seventh modification in accordance with at least one embodiment in an enlarged form.

FIG. 17 is a diagram illustrating a portion of a motor according to a seventh modification in accordance with at least one embodiment in an enlarged form.

In the seventh modification, a side surface 252A of a cylindrical portion 252 includes a groove 252B extending in the axial direction at one circumferential position. The groove 252B contributes to increasing the speed at which scattered oil 8A will be retrieved with surface tension caused by the groove 252B.

Note that, in the configuration illustrated in FIG. 14, in which the seal member 25 is not provided, a groove may be defined in an outer circumferential surface of the sleeve 24.

While some embodiments of the present disclosure and several modifications thereof have been described above, it should be noted that features in accordance with at least one embodiment and the modifications thereof may be combined appropriately as long as no conflict arises.

Some embodiments of the present disclosure are applicable to, for example, bearing apparatuses, motors, and fan motors.

Features in accordance with at least one embodiments and the modifications thereof may be combined appropriately as long as no conflict arises.

While some embodiments of the present disclosure have been described above, it is to be understood that variations and modifications will be apparent to those skilled in the art without departing from the scope and spirit of the present disclosure.

What is claimed is:

1. A bearing apparatus for a motor, the bearing apparatus comprising:
a cylindrical sleeve centered on a central axis extending in an axial direction;
a shaft extending along the central axis, inserted in the sleeve, rotatable with respect to the sleeve, and including an axially upper end portion projecting from the sleeve;
lubricating oil arranged in a gap defined between an inner circumferential surface of the sleeve and an outer circumferential surface of the shaft; and
an annular member fixed to an outer circumferential surface of the axially upper end portion of the shaft, and configured to rotate together with the shaft, wherein the annular member includes a projecting portion projecting axially downward; and
the sleeve and an axially lower end portion of the projecting portion overlap each other when viewed in the axial direction.

2. The bearing apparatus according to claim 1, wherein an outer circumferential surface of the sleeve includes a groove extending in the axial direction.

3. A motor, comprising the bearing apparatus of claim 1.

4. A fan motor, comprising the bearing apparatus of claim 1.

5. A bearing apparatus for a motor, the bearing apparatus comprising:
a cylindrical sleeve centered on a central axis extending in an axial direction;
a shaft extending along the central axis, inserted in the sleeve, rotatable with respect to the sleeve, and including an axially upper end portion projecting from the sleeve;
lubricating oil arranged in a gap defined between an inner circumferential surface of the sleeve and an outer circumferential surface of the shaft;
a seal member arranged at an axially upper end portion of the sleeve; and
an annular member fixed to an outer circumferential surface of the axially upper end portion of the shaft, and configured to rotate together with the shaft, wherein
the annular member includes a projecting portion projecting axially downward,
the seal member and an axially lower end portion of the projecting portion overlap each other when viewed in at least one of the axial direction or a radial direction and the seal member includes:
an annular cover portion covering an axially upper surface of the sleeve; and
a cylindrical portion extending axially downward from a radially outer end portion of the cover portion, and covering an outer circumferential surface of the sleeve.

6. The bearing apparatus according to claim 5, wherein an axially upper surface of the cover portion includes:
a flat surface extending radially, and
a first slanting surface extending axially downward and radially inward from the flat surface;
a radially outer and axially lower end portion of the projecting portion overlaps the first slanting surface when viewed in each of the axial direction and the radial direction; and
the annular member and the seal member are closest to each other between the first slanting surface and the radially outer and axially lower end portion of the projecting portion.

7. The bearing apparatus according to claim 5, wherein
an outer circumferential surface of the cylindrical portion includes a side surface extending in the axial direction;
a radially inner and axially lower end portion of the projecting portion overlaps the side surface when viewed in the radial direction; and
the annular member and the seal member are closest to each other between the side surface and the radially inner and axially lower end portion of the projecting portion.

8. The bearing apparatus according to claim 5, wherein
an axially upper surface of the cover portion includes:
a flat surface extending radially, and
a second slanting surface extending axially downward and radially outward from the flat surface;
a radially inner and axially lower end portion of the projecting portion overlaps the second slanting surface when viewed in each of the axial direction and the radial direction; and
the annular member and the seal member are closest to each other between the second slanting surface and the radially inner and axially lower end portion of the projecting portion.

9. The bearing apparatus according to claim 5, wherein
an outer circumferential surface of the cylindrical portion includes a side surface extending in the axial direction;
an axially upper surface of the cover portion includes:
a flat surface extending radially, and
a second slanting surface extending axially downward and radially outward from the flat surface;
one of the side surface and the second slanting surface includes a first shoulder portion;
the axially lower end portion of the projecting portion includes a second shoulder portion; and
the annular member and the seal member are closest to each other between the first shoulder portion and the second shoulder portion.

10. The bearing apparatus according to claim 5, wherein an outer circumferential surface of the cylindrical portion includes a groove extending in the axial direction.

11. The bearing apparatus according to claim 5, further comprising a sleeve housing supporting the sleeve, wherein
the sleeve housing includes a cylindrical side wall portion arranged radially outward of the cylindrical portion of the seal member, arranged radially outward of the projecting portion, and arranged opposite to the cylindrical portion with a space therebetween, the space having the lubricating oil arranged therein; and
the space is in communication with the gap.

12. The bearing apparatus according to claim 11, wherein at least a portion of the projecting portion overlaps the space when viewed in the axial direction.

13. The bearing apparatus according to claim 5, wherein
an axially upper surface of the cover portion includes a flat surface extending radially; and
each of (i) the flat surface of the axially upper surface of the cover portion and (ii) a lower surface of the annular member has an oil-repellent agent applied thereto.

14. The bearing apparatus according to claim 11, wherein
at least a portion of the axially lower end portion of the projecting portion is arranged radially outward of the seal member;

an inner circumferential surface of the side wall portion includes:
  a first inner circumferential surface arranged radially opposite to the projecting portion; and
  a second inner circumferential surface arranged axially below the axially lower end portion of the projecting portion and radially inward of the first inner circumferential surface; and
the second inner circumferential surface overlaps the projecting portion when viewed in the axial direction.

15. The bearing apparatus according to claim 11, wherein
at least a portion of the axially lower end portion of the projecting portion is arranged radially outward of the seal member; and
an inner circumferential surface of the side wall portion is recessed radially outward.

16. The bearing apparatus according to claim 14, wherein the inner circumferential surface of the side wall portion includes:
  an increased diameter portion extending radially downward from an axially upper end of the inner circumferential surface of the side wall portion while slanting radially outward, and
a decreased diameter portion extending axially downward from an axially lower end of the increased diameter portion while slanting radially inward.

17. A bearing apparatus for a motor, the bearing apparatus comprising:
  a cylindrical sleeve centered on a central axis extending in an axial direction;
  a shaft extending along the central axis, inserted in the sleeve, rotatable with respect to the sleeve, and including an axially upper end portion projecting from the sleeve;
  lubricating oil arranged in a gap defined between an inner circumferential surface of the sleeve and an outer circumferential surface of the shaft;
  a seal member arranged at an axially upper end portion of the sleeve; and
  an annular member fixed to an outer circumferential surface of the axially upper end portion of the shaft, and configured to rotate together with the shaft, wherein the annular member includes a projecting portion projecting axially downward;
the seal member includes:
  an annular cover portion covering an axially upper surface of the sleeve; and
  a cylindrical portion extending axially downward from a radially outer end portion of the cover portion, and covering an outer circumferential surface of the sleeve; and
the radially outer end portion of the cover portion and an inner circumferential surface of the projecting portion overlap each other when viewed in the axial direction.

* * * * *